United States Patent
Naidu et al.

(10) Patent No.: US 10,576,840 B2
(45) Date of Patent: Mar. 3, 2020

(54) BATTERY SYSTEM

(71) Applicant: Ford Global Technologies, LLC, Dearborn, MI (US)

(72) Inventors: Paspuleti Ashish Kumar Naidu, Dearborn, MI (US); Allan Alimario, Rochester Hills, MI (US); Peter George Brittle, Romford (GB); Benjamin A. Tabatowski-Bush, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 15/655,613

(22) Filed: Jul. 20, 2017

(65) Prior Publication Data
US 2018/0029588 A1    Feb. 1, 2018

(30) Foreign Application Priority Data
Jul. 26, 2016 (GB) .................................. 1612919.9

(51) Int. Cl.
*B60L 58/12* (2019.01)
*B60L 50/60* (2019.01)
(Continued)

(52) U.S. Cl.
CPC ............... *B60L 50/66* (2019.02); *B60L 50/64* (2019.02); *B60L 58/10* (2019.02); *B60L 58/12* (2019.02);
(Continued)

(58) Field of Classification Search
CPC .......... B60L 50/64; B60L 50/66; B60L 58/12; B60L 58/21; H01M 10/443
See application file for complete search history.

(56) References Cited

U.S. PATENT DOCUMENTS

| 2003/0132730 A1* | 7/2003 | Ochiai | B60K 6/485 320/104 |
| 2010/0261048 A1* | 10/2010 | Kim | H01M 10/44 429/150 |

(Continued)

FOREIGN PATENT DOCUMENTS

| EP | 2562910 A1 | 2/2013 |
| FR | 2921590 A1 | 4/2009 |

(Continued)

OTHER PUBLICATIONS

Intellectual Property Office of Great Britain, Combined Search and Examination Report Issued in Application No. 1612919.9, dated Jan. 26, 2017, South Wales, 8 pages.

*Primary Examiner* — Dale Moyer
(74) *Attorney, Agent, or Firm* — David Kelley; McCoy Russell LLP

(57) ABSTRACT

A hybrid vehicle battery system that comprises a plurality of cells that are electrically coupled to an electric motor of the vehicle is provided, the electric motor being mechanically coupled to a drive system of the vehicle. The battery system is configured to: determine a voltage requirement of the battery system at least partially based on a current operating mode or an anticipated operating mode; and adjust the configuration of the cells in order to increase or decrease the voltage of the battery system according to the requirement. A method of operating a hybrid vehicle is also provided.

17 Claims, 7 Drawing Sheets

(51) Int. Cl.
    *B60L 58/21*     (2019.01)
    *B60L 50/64*     (2019.01)
    *B60L 58/10*     (2019.01)

(52) U.S. Cl.
    CPC ............ *B60L 58/21* (2019.02); *Y02T 10/705* (2013.01); *Y02T 10/7005* (2013.01); *Y02T 10/7044* (2013.01); *Y10S 903/93* (2013.01)

(56) References Cited

U.S. PATENT DOCUMENTS

| | | | |
|---|---|---|---|
| 2010/0289447 A1 | 11/2010 | Dobson et al. | |
| 2010/0315043 A1* | 12/2010 | Chau | B60L 3/0046 320/134 |
| 2012/0319493 A1* | 12/2012 | Kim | H01M 10/4207 307/80 |
| 2013/0169038 A1* | 7/2013 | King | B60L 58/18 307/10.1 |
| 2014/0312687 A1 | 10/2014 | Gu et al. | |
| 2015/0377203 A1* | 12/2015 | Neet | F02N 11/0866 290/31 |
| 2016/0046200 A1* | 2/2016 | Timmons | B60L 11/1855 318/139 |

FOREIGN PATENT DOCUMENTS

| | | |
|---|---|---|
| JP | 2009262894 A | 11/2009 |
| WO | 2005020348 A2 | 3/2005 |
| WO | 2010118310 A2 | 10/2010 |
| WO | 2011002482 A1 | 1/2011 |
| WO | 2016025565 A1 | 2/2016 |

* cited by examiner

BATTERY SYSTEM

CROSS REFERENCE TO RELATED APPLICATION

The present application claims priority to Great Britain Patent Application No. 1612919.9, filed on Jul. 26, 2016, the entire contents of which are hereby incorporated by reference for all purposes.

TECHNICAL FIELD

The present disclosure relates to a battery system for a motor vehicle and is particularly, although not exclusively, concerned with a battery system configured to improve the ability of the motor vehicle to perform a stop start event.

BACKGROUND

Many vehicles are fitted with a hybrid drive system in which an electric motor, powered by batteries, is provided alongside an Internal Combustion Engine (ICE). In many arrangements, both the electric motor and the ICE are coupled to a drive train of the vehicle and configured to supply torque to the drive train.

In contrast to a conventional starter motor, the electric motor may be capable of delivering torque into the drive train whilst the vehicle is in motion. Hence, the hybrid electric vehicle may be capable of cranking and starting the ICE whilst the vehicle is in motion.

In some arrangements, the electric motor may be configured to provide torque to assist in driving the wheels of the vehicle, e.g. in order to allow the ICE to be smaller and/or operate closer to its optimum operating point. The electric motor may also enable the vehicle to be driven at low speeds without the use of the ICE. Additionally or alternatively, the electric motor may be configured to crank the engine, to allow the ICE to be stopped when torque is not required to drive the vehicle, for example, whilst the vehicle is coasting, braking or stopped, and restarted quickly when required.

In order to crank and restart the ICE, the electric motor may require a high voltage to be supplied from the batteries to drive the motor. If the voltage of the batteries is too low, the stop-start functionality of the vehicle may be disabled and the ICE may run constantly during operation of the hybrid vehicle.

One example approach for adjusting the output of a system battery is shown by Timmons et al. in WO2016025565A1. Therein, a controller controls switches of battery modules to bypass any identified malfunctioning battery modules. For example, the controller may transition between series, parallel, and bypassed connections so as to reduce voltage imbalance across different battery modules.

However the inventors herein have identified potential issues with such an approach. As one example, a controller may couple a set of battery modules to bypass a malfunctioning module and provide a target voltage. However, due to variations in the state of charge, state of health, and temperature of the coupled battery modules, the actual voltage provided may differ from the expected voltage, resulting in degraded hybrid vehicle performance, and increased fuel consumption due to frequent engine operation.

In one example, the above-mentioned issues may be at least partly addressed by a hybrid vehicle battery system, the battery system comprising a plurality of cells, wherein the battery system cells are electrically coupled to an electric motor of the hybrid vehicle, the electric motor being mechanically coupled to a drive system of the hybrid vehicle, wherein the hybrid vehicle has a first operating mode, in which the battery system cells provide power to the drive system, and a second operating mode, in which the battery system cells receive power from the drive system wherein the battery system further comprises one or more additional cells, selectively electrically couplable to the electric motor, wherein the battery system is configured to: determine that a state of charge of one or more cells of the battery system is below a threshold value and/or that the temperature of the battery system is below a threshold value; electrically connect the battery system cells and the additional cells together so as to increase the voltage of the battery system; and permit a stop-start operation of an internal combustion engine of the hybrid vehicle.

In one example, the battery system may be configured to determine a voltage requirement of the battery system at least partially based on a current operating mode or an anticipated operating mode of the hybrid vehicle. The battery system may be configured to adjust the configuration of the cells in order to increase or decrease the voltage of the battery system according to the voltage requirement.

The additional cells and plurality of cells may be provided in the same battery system package.

The electric motor may provide mechanical power to assist in re-starting the internal combustion engine.

The battery system may be configured to adjust the configuration of the cells at least partially based on the temperature of the battery system. Additionally or alternatively, the battery system may be configured to adjust the configuration of the cells at least partially based on the state of charge of one or more cells of the battery system Adjusting the configuration of the cells may comprise, for example, adjusting the number of active cells within the battery system, e.g. the number of cells contributing to the voltage and/or current supplied by the battery system.

Additionally or alternatively, adjusting the configuration of the cells may comprise increasing or decreasing the number of series connections between the cells. In other words, adjusting the configuration of the cells may comprise decreasing or increasing the number of parallel connections between the cells.

The battery system may further comprise a plurality of switches configured to allow one or more of the cells to be selectively connected to the others of the cells in a plurality of configurations. For example, the plurality of switches may be configured to allow the cells to be connected in series and parallel configurations.

Additionally or alternatively, the switches may be configured to allow one or more of the cells to be selectively isolated from the others of the cells. Adjusting the configuration of the battery system may comprise isolating one or more of the cells from the others of the cells. The cells may be isolated at random.

The cells may be provided within first and second groups of cells. The configuration of the first group of cells may be adjustable and the configuration of the second group may not be adjustable.

The battery system may be configured to determine a voltage of one or more of the cells or groups of cells. The battery system may be further configured to isolate one or more of the cells or groups of cells from the others of the cells at least partially based on the voltage of the cells. Additionally or alternatively, the cells may be isolated at least partially based on the current operating mode or the anticipated operating mode of the hybrid vehicle. For example, if the current operating mode and/or the anticipated operating mode is the first operating mode, cells having a low voltage, e.g. compared to the other cells, may be isolated. If the current operating mode and/or the anticipated operating mode is the second operating mode, cells having a high voltage may be isolated.

A hybrid vehicle may comprise the above-mentioned battery system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in the drawings.

DETAILED DESCRIPTION

Figure 1:
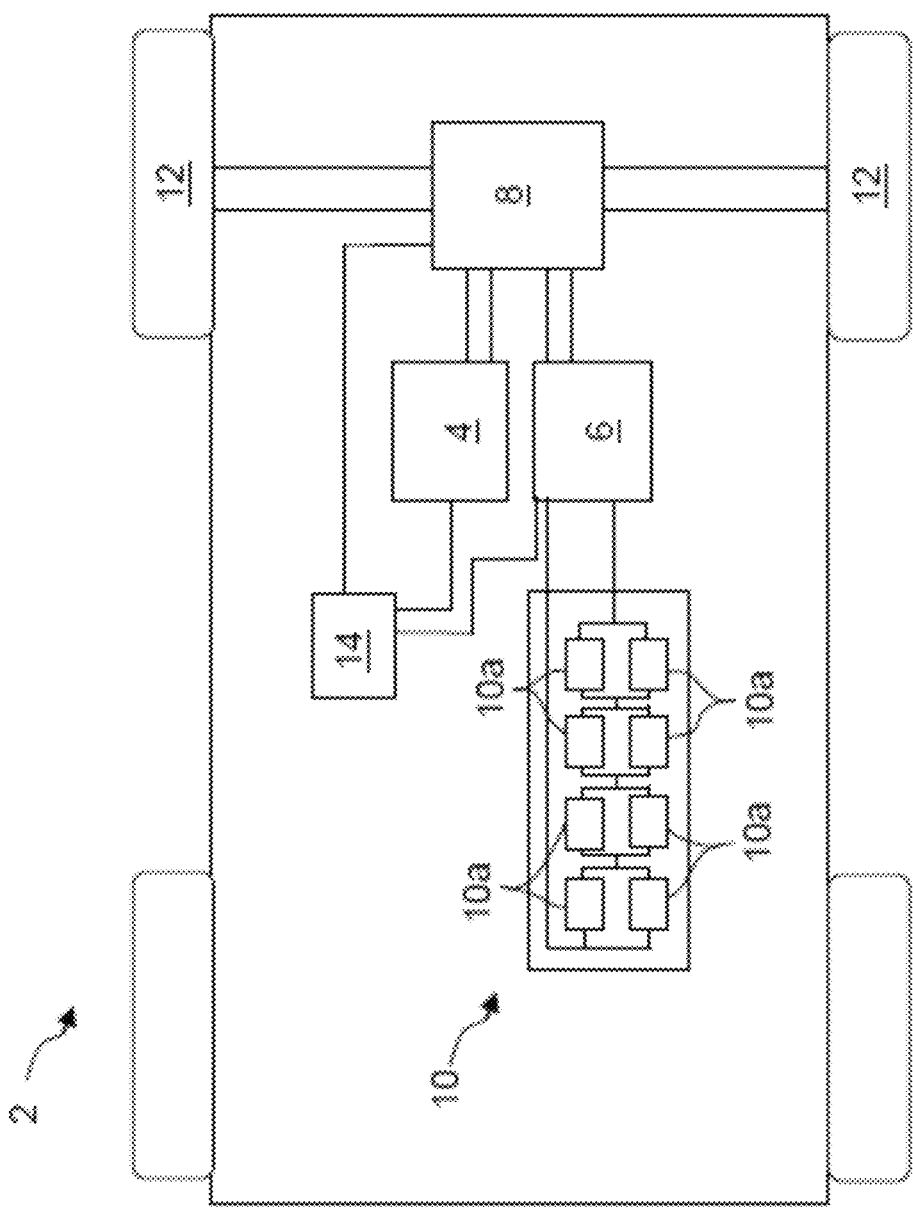
FIG. 1 is a schematic view of a hybrid vehicle comprising a battery system according to the prior art.

Methods and systems are provided for operating a hybrid vehicle, such as the vehicle of FIG. 1, wherein the hybrid vehicle comprises: an internal combustion engine and a battery system having a plurality of cells, the battery system cells electrically coupled to an electric motor of the vehicle, the electric motor being mechanically coupled to a drive system of the vehicle, wherein the hybrid vehicle has a first operating mode, in which the battery system cells provide power to the drive system, and a second operating mode, in which the battery system cells receive power from the drive system. As depicted with reference to FIGS. 2-7 and FIG. 9, the battery system further comprises one or more additional cells selectively electrically couplable to the electric motor. A controller may be configured to perform a control routine, such as the example routine of FIG. 8 to determine that a state of charge of one or more cells of the battery system is below a threshold value or that the temperature of the battery system is below a threshold value; electrically connect the battery system cells and additional cells together so as to increase the voltage of the battery system; and permit a stop-start operation of the internal combustion engine at the battery system temperature below the threshold value.

The method performed by the controller may also comprise: determining a voltage requirement of the battery system at least partially based on a current operating mode or an anticipated operating mode of the hybrid vehicle. The method may further comprise adjusting the configuration of the cells in order to increase or decrease the voltage of the battery system according to the voltage requirement.

The method performed by the controller may further comprise adjusting the configuration of the cells at least partially according to the state of charge. If the state of charge is below a threshold SOC level, the configuration of the battery system may be adjusted to increase the number of active (e.g. electrically connected) cells within the battery system and/or increase the number of series connections between cells. If the state of charge rises above the threshold SOC level, the configuration of the battery system may be adjusted to reduce the number of active cells within the battery system and/or increase the number of parallel connections between cells.

The method performed by the controller may further comprise adjusting the configuration of the cells at least partially according to the temperature. If the temperature is below a first threshold value, the configuration of the battery system may be adjusted to increase the number of active (e.g. electrically connected) cells within the battery system. If the temperature rises above the first threshold value, the configuration of the battery system may be adjusted to reduce the number of active cells within the battery system.

If the temperature is above a second threshold value, the configuration of the cells may be adjusted by the controller to decrease the number of active cells within the battery system. If the temperature falls below the second threshold value, the configuration of the battery system may be adjusted to increase the number of active cells within the battery system. The first threshold value may relate to a lower temperature threshold and the second threshold value may relate to an upper temperature threshold. In other words, the second threshold value may be greater than the first threshold value. By reducing the number of active cells, the voltage of the battery system may be reduced so that the voltage does not exceed a maximum voltage for the hybrid system. As a result, deactivating cells may allow a high temperature limit of the battery system to be increased.

If the current operating mode or the anticipated operating mode of the hybrid vehicle is the first operating mode, the configuration of the cells may be adjusted in order to increase the number of series connections between the cells.

Alternatively, if the current operating mode or the anticipated operating mode of the hybrid vehicle is the second operating mode, the configuration of the cells may be adjusted in order to increase the number of parallel connections between the cells.

The method may comprise determining a voltage of one or more of the cells. The method may further comprise isolating one or more of the cells from the others of the cells at least partially based on the voltage of the cells. The cells may be isolated at least partially based on the current operating mode or the anticipated operating mode of the hybrid vehicle.

If the current or anticipated operating mode is the first operating mode, one or more cells having a lower voltage than others of the cells may be isolated, e.g. in order to increase the voltage of the battery system.

If the current or anticipated operating mode is the second operating mode, one or more cells having a voltage that is higher than others of the cells may be isolated, e.g. in order to decrease the voltage of the battery system. This may allow the cells having a lower state of charged to be charged whilst the battery system is operating within the second operating mode.

Adjusting the configuration of the cells may comprise isolating one or more of the cells at random from the others of the cells. This may lead to a substantially equal duty cycle being applied to each of the cells.

The method may further comprise determining that one or more of the cells may be faulty. The method may further comprise isolating the faulty cells. A cell may be determined to be faulty if the voltage of the cell differs from the voltages of each of the other cells by a predetermined amount. Alternatively, a cell may be determined to be faulty if the voltage of the cell differs from an expected voltage of the cell by the predetermined amount.

The method may further comprise removing a start-stop inhibitor to enable the hybrid vehicle to perform a start-stop procedure.

With reference to FIG. 1, a hybrid vehicle 2 comprises an Internal Combustion Engine (ICE) 4 and an electric motor 6, which are both mechanically coupled to a drive system 8 and configured to provide torque to the drive system 8. The motor 6 may be coupled to a crankshaft of the ICE 4, e.g. directly or via a differential. Alternatively, the motor 6 may be coupled, e.g. directly coupled, to one or more wheels of the vehicle.

The vehicle 2, comprises a battery system 10, which is electrically coupled to the electric motor 6 and configured to provide power to the electric motor 6. The battery system 10 comprises a plurality of cells 10a. As depicted in FIG. 1, the cells 10a may be arranged in groups, e.g. in pairs. The cells 10a in each group may be connected in parallel with each of the other cells in the group. Each group of cells may be connected to each of the other groups in series.

The drive system 8 is mechanically coupled to wheels 12 of the vehicle 2 and delivers the torque from the ICE 4 and the electric motor 6 to the wheels 12 in order to drive the vehicle 2.

The vehicle further comprises a controller 14, such as a powertrain control module, configured to control the operation of the ICE 4, the electric motor 6 and the drive system 8.

In the arrangement depicted in FIG. 1, the vehicle 2 is a mild hybrid vehicle. The controller 14 is configured to operate the electric motor 6 in a first operating mode to provide additional torque to assist the ICE 4 in driving the wheels 12 of the vehicle 2. Additionally, when the controller 14 determines that a driver of the vehicle, or another controller (not shown) of the vehicle, is not requesting that torque be supplied to the wheels and/or if the vehicle is braking, e.g. negative torque is being supplied to the wheels, the controller 14 is configured to switch off the ICE 4 in order to reduce fuel consumption of the vehicle 2. When the controller 14 determines that the driver or other controller of the vehicle is once again requesting torque to be supplied to the wheels 12, the controller 14 controls the operation of the electric motor to supply toque to the drive system 8 to crank and start the ICE 4.

When it is desirable to supply negative torque to the wheels 12, for example, when the driver or the other controller is requesting that the vehicle 2 decelerate, the negative, e.g. braking, torque may be provided by a brake system of the vehicle. Additionally or alternatively, the drive system 8 may be configured to provide the negative torque, e.g. to receive torque from the wheels 12. When the drive system 8 is receiving torque from the wheels 12, the drive system 8 may supply the received torque to the electric motor 6, which may be configured to act as a generator to charge the battery system 10, in a second operating mode of the electric motor 6 and battery system 10.

During operation of the hybrid vehicle 2, the voltage of the battery system 10, e.g. the voltage that the battery system 10 is able to supply to the electric motor 6 may vary. For example, if the battery system 10 has a low state of charge, the voltage of the battery system 10 may be reduced.

In order to supply sufficient power to the drive system 8 in order to crank and start the ICE 4, the electric motor 6 may require a high voltage from the battery system 10, e.g. a voltage above a threshold value. The controller 14 may be configured to monitor the voltage of the battery system 10 and may inhibit, e.g. prevent, the vehicle from performing a start-stop procedure of the ICE 4 if the voltage of the battery system 10 is below the threshold value. This may ensure that the ICE 4 is not stopped when insufficient voltage is available to restart the ICE 4.

Depending on the operating mode of the battery system 10 and electric motor 6, it may be desirable for the battery system 10 to operate at different voltages. For example, when the battery system 10 is providing electrical power to the electric motor 6, it may be desirable for the voltage of the battery system to be high, in order to allow a desirable torque to be supplied by the electric motor 6 to the drive system 8. By contrast, when the battery system 10 is receiving electric power from the electric motor 6, or another voltage source, it may be desirable for the voltage of the battery system 10 to be low in order to increase the speed with which the battery system 10 may be charged.

In the arrangement shown in FIG. 1, the configuration of the battery system 10, e.g. the connections between the cells 10a in the battery system 10 is fixed. Hence, in this arrangement, the configuration of the battery system 10 may be set in order to operate adequately in both the first and second operating modes. However, the configuration of the battery system 10 depicted in FIG. 1 may not provide the optimal efficiency in either operating mode.

Figure 2:
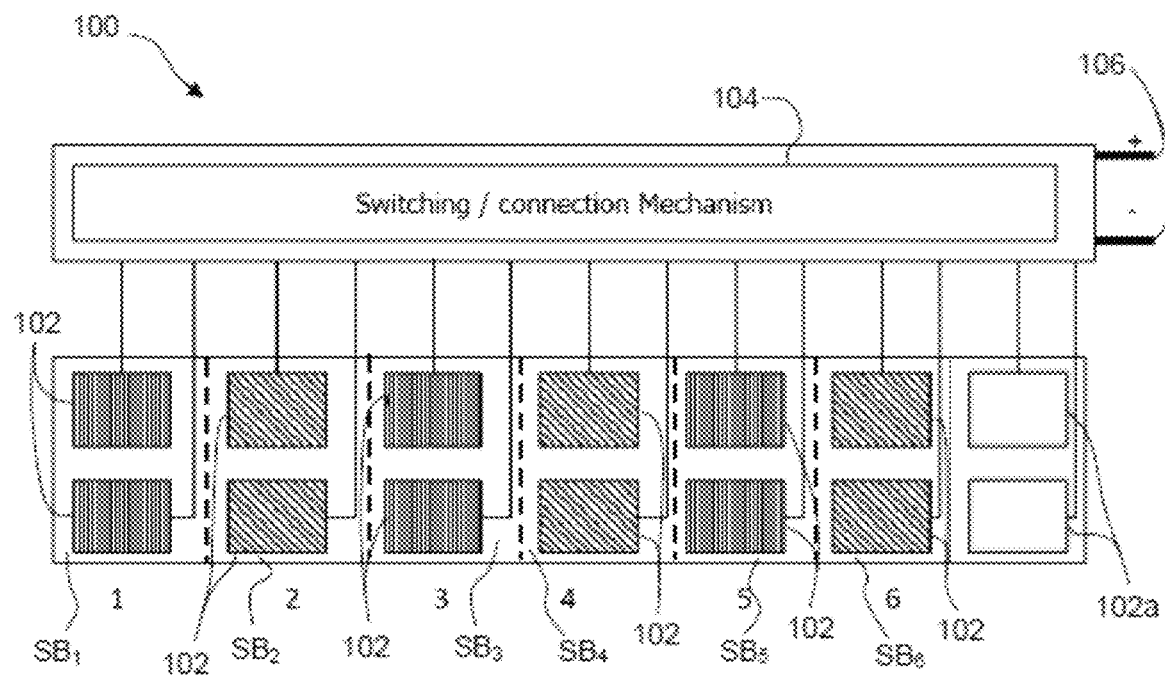
FIG. 2 is a schematic view of a battery system for the hybrid vehicle, according to arrangements of the present disclosure, the battery system being depicted in a first example configuration.

With reference to FIG. 2, a battery system 100 according to arrangements of the present disclosure will now be described. The battery system 100 comprises a plurality of cells 102, a switching system 104 and terminals 106. The battery system 100 may be provided within the hybrid vehicle 2 in place of the battery system 10. The terminals 106 of the battery system 100 may be couplable, e.g. electrically couplable, to the electric motor 6, e.g. according to the operation of the controller 14.

As depicted in FIG. 2, each of the cells may be connected to the switching system 104. The switching system 104 may be configured to electrically couple, one, more than one or each of the cells 102 to one or more of the others of the cells and/or to the terminals 106 of the battery system 100.

The switching system 104 may be configured to adjust the configuration of the cells 102, e.g. the connections between the cells, as desired. For example, the switching system 104 may be configured to adjust the configuration of the cells 102 in order to increase the number of series connections between the cells 102. Alternatively, the switching system 104 may be configured to adjust the configuration of the cells 102 in order to increase the number of parallel connections between the cells.

For example, in the arrangement depicted in FIG. 2, the switching system 104 is configured to connect the cells 102 in an arrangement including six parallel branches, each parallel branch including two cells connected in series. By contrast, in the arrangement depicted in FIG. 3, the switching system 104 is configured to connect the cells 102 such that each of the cells 102 is connected in series.

Adjusting the configuration of the cells 102 in this way may affect the voltage of the battery system 100, e.g. at the terminals 106. For example, when each of the cells 102 is connected in series, the voltage of the battery system 100 may be greater than when the cells 102 are connected within two or more parallel branches.

When the battery system 100 is provided within the hybrid vehicle 2, the controller 14 may be configured to control the operation of the switching system 104 to determine the configuration of the cells 102.

As described above with reference to FIG. 1, when the hybrid vehicle is operating in the first operating mode, e.g. the battery system 10 is providing power to the electric motor 6 to crank and start the ICE 4, it may be desirable for the battery system 10 to provide a high voltage. Hence, if the vehicle 2 is provided with the battery system 100, when the controller 14 is controlling, or is preparing to control, the electric motor 6 to provide torque to crank the ICE 4, the controller 14 may control the operation of the switching system 104 in order to increase the number of series connections between the cells 102 and thereby increase the voltage at the terminals 106 of the battery system 100.

In the second operating mode, when the drive system 8 is receiving torque from the wheels 12, e.g. when the drive system 8 is being used to provide a braking torque to the wheels 12, it may be desirable for the voltage of the battery system 100 to be low, e.g. lower than a voltage generated by the electric motor 6, in order to allow the electric motor 6 to charge the cells 102 of the battery system. Hence, when operating in the second operating mode, the controller 14 may control the operation of the switching system 104 in order to increase the number of parallel connections between the cells 102 and thereby reduce the voltage at the terminals 106 of the battery system.

The switching system 104 may also be capable of selectively isolating one, more than one, or each of the cells 102 of the battery system 100 from the terminals 106. The switching system may be configured to allow any of the cells to be isolated as desirable, individually or in combination with others of the cells. In some configurations, isolating one or more of the cells 102 from the terminals 106 may reduce the voltage of the battery system 100. Hence, when it is desirable to reduce the voltage of the battery system 100, the switching system 104 may be controlled, e.g. by the controller 14, to isolate one or more of the cells 102. Isolating one or more of the cells 102 may be performed in addition or as an alternative to changing the configuration of the cells 102 to increase the number of parallel connections between the cells 102.

It may be desirable to ensure that each of the cells 102 provided within the battery system 100 are charged and discharged evenly, e.g. such that one or more of the cells does not fall to a significantly lower state of charge than the others of the cells. Hence, when the switching system 104 is controlled to isolate one or more of the cells 102, e.g. to reduce the voltage of the battery system 100 when performing regenerative braking, the cells 102 to be isolated may be selected by the switching system 104 or the controller 14 in order to prevent the state of charge of one or more of the cells 102 falling below the state of charge of the other cells 102.

In some arrangements, the cell to be isolated may be selected randomly. Additionally or alternatively, the switching system 104 or the controller 14 may be configured to determine a voltage of one or more of the cells and may isolate one or more of the cells at least partially based on the voltage. For example, the voltage may be used to infer a state of charge of the cells and the switching system 104 may isolate one or more cells having a higher voltage, e.g. a high state of charge. In this way cells having a lower state of charge may be charged preferentially.

If one or more cells 102 of the battery system develops a fault, the faulty cells may reduce the voltage of the battery system 100 and/or may prevent the cells 102 of the battery system 100 from charging effectively. It may be desirable to isolate faulty cells from the others of the cells 102 and/or the terminals 106. The faulty cells may be isolated temporarily, e.g. during a particular trip or until the battery system 100 has been fully recharged. Alternatively, the faulty cell may be isolated permanently, e.g. until the faulty cell or the battery system 100 is repaired or replaced.

The faulty cells may be identified by determining the voltage of the cells. Cells having a voltage that differs from others of the cells by more than a predetermined amount may be deemed to be faulty. Alternatively or additionally, an expected voltage of a cell may be calculated based on the cell's discharge and charge history. If the determined voltage of the cell differs from the expected voltage by more than a certain amount then the cell may be deemed faulty.

If the state of charge of one or more of the cells within the battery system 100 is low, the voltage of the battery system 100 may be reduced. Furthermore, the cells 102 of the battery system 100 may have an operating temperature range, outside of which the voltage of the cells may be low. When the battery system is operating outside of the operating temperature range, e.g. at a lower or higher temperature, the voltage of the battery system 100 may be low, even when the state of charge of the cells 102 is good.

If the state of charge of one or more of the cells is low, the controller may determine that the voltage of the battery system 100 is below a threshold value and may inhibit the vehicle 2 from performing a start-stop procedure. In the same way, when the vehicle 2 is operating in a cold climate, the controller 14 may determine that the temperature or voltage of the battery system 100 is below a threshold level and may inhibit the vehicle 2 from performing a start-stop procedure of the ICE 4.

It may be apparent to the driver that the vehicle 2 is not performing the start-stop procedure, which may give the driver the impression that the vehicle 2 is not operating correctly and/or that the hybrid drive system is not operating effectively to reduce the fuel consumption of the vehicle 2.

The battery system 100 may increase in temperature during use of the vehicle 2, e.g. due to use of the ICE 4 and/or electric motor 6, and hence, after a period of operating, the controller 14 may determine that the temperature or voltage is above the threshold level and may remove the inhibitor to allow the vehicle to perform stop-start procedures when appropriate.

Figure 3:
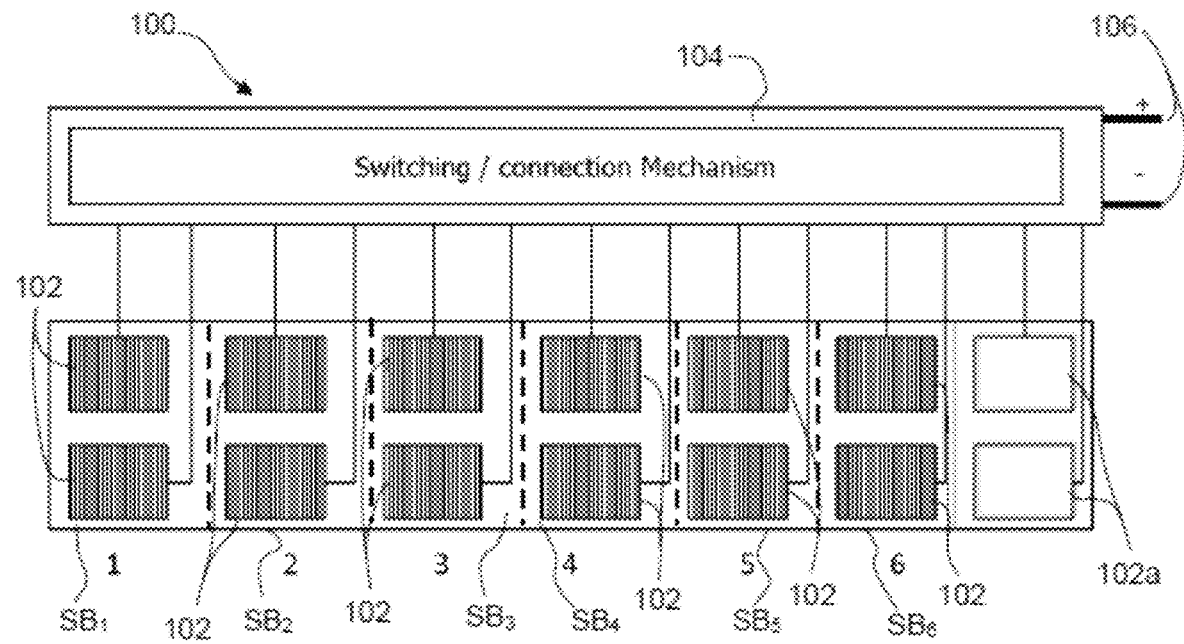
FIG. 3 is a schematic view of the battery system depicted in a second example configuration.

As shown in FIGS. 2 and 3, the cells within the battery system may be provided within switching blocks SB. In the arrangements shown in FIGS. 2 and 3, the battery systems comprise six switching blocks, each comprising two cells. However, it is envisaged that any number of switching blocks SB may be provided. Furthermore, in other arrangements of the disclosure, more than two cells may be provided within each switching block. For example, three, four, five, six or any other number of cells may be provided within each of the switching blocks SB. Alternatively, the switching blocks may comprise a single cell. Each of the switching blocks may comprise the same number of cells, alternatively, one, more than one or each of the switching blocks may comprise a different number of cells.

Figure 4A:
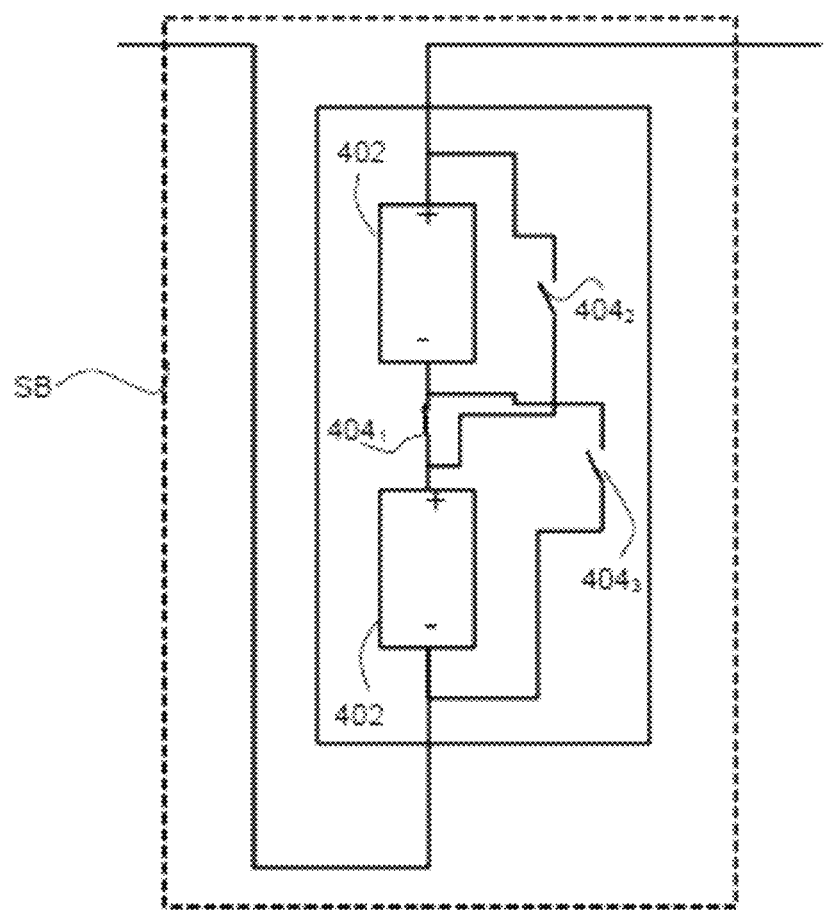
FIGS. 4A and 4B are schematic views of a switching block according to arrangements of the present disclosure.
Figure 4B:
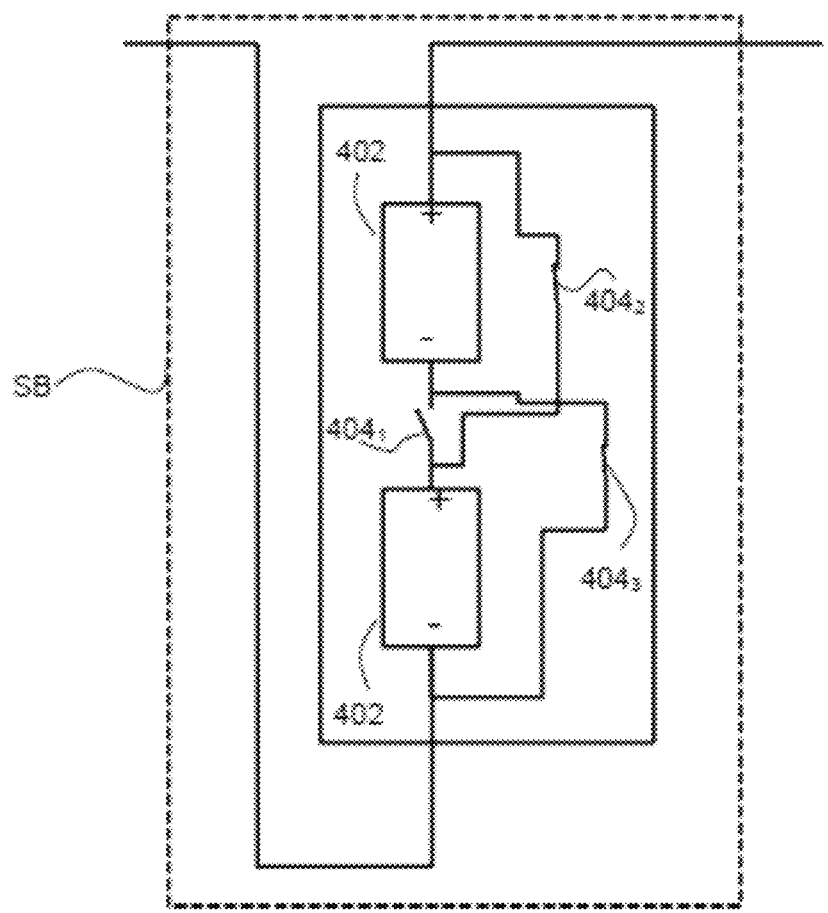

With reference to FIGS. 4A and 4B, cells 402 within each of the switching blocks may be electrically coupled with the other cells of the switching block SB by the switching system 104. For example, as shown in FIGS. 4A and 4B, the cells 402 may be coupled to one or more switches 404 provided by the switching system 104. The switches 404 may be configured to allow the cells 402 within the switching block SB to be selectively coupled together in one or more configurations. For example, in the arrangement depicted in FIG. 4A, a first switch 404₁ may be connected (with second and third switches 404₂, 404₃ being disconnected) in order to provide a series connection between the cells 402. Alternatively, as depicted in FIG. 4B, the second and third switches 404₂, 404₃ may be connected (with the first switch 404₁ being disconnected) in order to provide a parallel connection between the cells 402.

Figure 5:
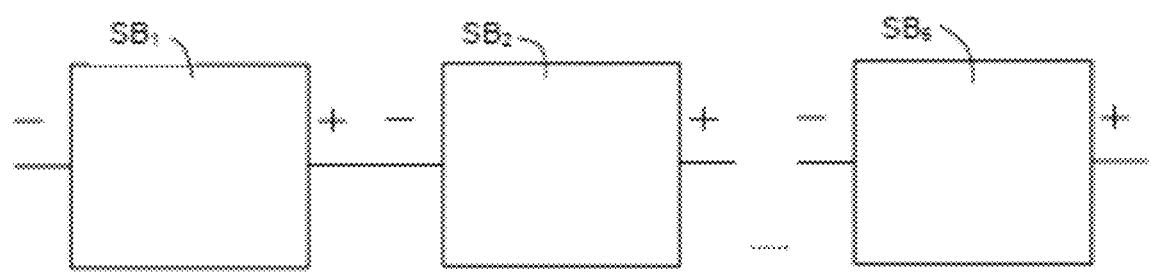
FIG. 5 is a schematic view of a plurality of switching blocks connected in series.

With reference to FIG. 5, the switching blocks SB may be coupled together in a series configuration. In this way, the switching system may be capable of switching between a configuration in which each of the cells 402 within the battery system are coupled to each of the other cells in series and one or more different configurations in which two of more of the cells in one or more of the switching blocks are connected in parallel.

In the arrangement shown in FIG. 5, each of the switching blocks is provided with the switches 404 and is capable of selectively varying the configurations of the cells within the switching block. However, it is equally envisaged that in some arrangements, one or more of the switching blocks SB may not comprise switches and the configuration of connections between the cells within the switching block SB may be fixed.

Figure 6:
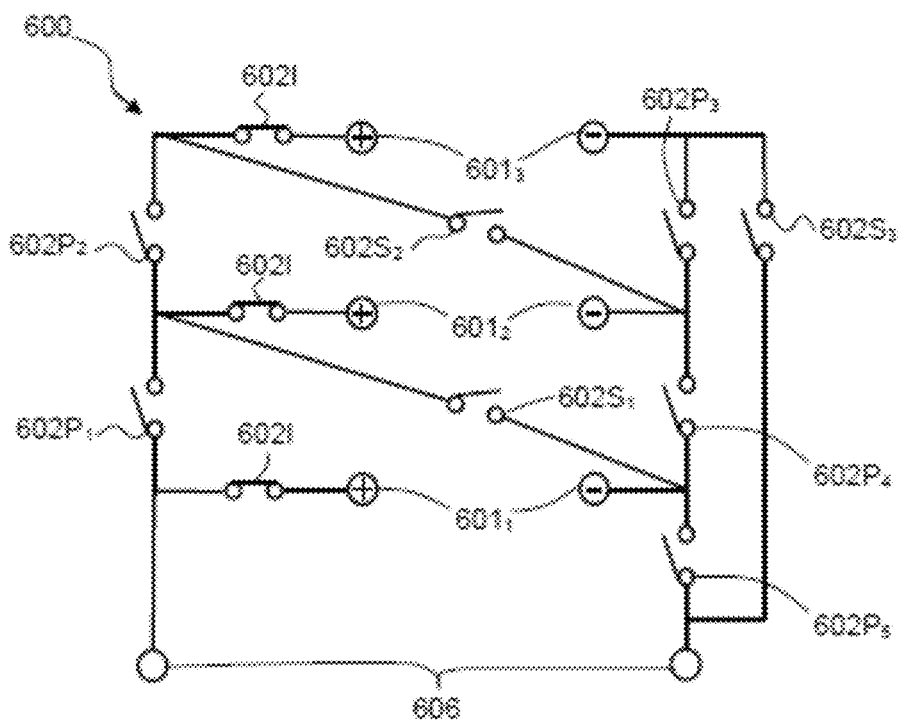
FIG. 6 is a schematic view of a switching system for the battery system according to an arrangement of the present disclosure.

With reference to FIG. 6, in order to provide a greater number of possible configurations of cells within the battery system, a switching system 600, according to another arrangement of the present disclosure may be provided. The switching system 600 may be provided as an alternative to arranging the cells in switching blocks SB, which are connected together, or the switching system 600 may be provided within a switching block. The switching system 600 may be provided within the battery system 100 depicted in FIG. 2 or 3.

The switching system 600 depicted in FIG. 6 is configured to allow the configuration of connections between three cells to be selectively varied. However, the arrangement may be extended to allow the configuration of four, five, six or more cells to be selectively varied.

As depicted in FIG. 6, the switching system 600 comprises a plurality of cell terminals 601, a plurality of switches, including series switches 602S, parallel switch 602P and isolating switches 602I and terminals 606. The terminals 606 may be equivalent to the terminals 106 depicted in FIGS. 2 and 3, and may allow the battery system 100 comprising the switching system 600 to be coupled to the electric motor 6.

The switching system 600 may be coupled to the cells 102 of the battery system 100 at the cell terminals 601. An individual cell or group of cells may be connected to each terminal 601. The switches 602 are configured to selectively establish connections between the cell terminals 601. Depending on the combinations of the switches that are opened and closed, the configuration of the cells, and hence, the voltage available at the terminals 606 may be varied. For example, in the arrangement shown, if each of the series switches 602S is connected (with the parallel switches 602P disconnected), the cells 102 will be connected in series. Alternatively if each of the parallel switches 602P is connected (with the series switches 602S being disconnected), each of the cells 102 will be connected in parallel to each of the other cells 102.

The series and parallel switches 602S, 602P may be connected in different combinations in order to provide different series and parallel configuration of the cells as desired. For example, if switches $602S_1$, $602S_3$, $602P_2$, $602P_3$ and $602P_4$ are connected (with switches $602S_2$, $602P_1$ and $602P_4$ being disconnected), the cell connected at cell terminals $601_1$ will be connected in series with the cells connected at cell terminals $601_2$ and $601_3$, which will be connected in parallel with each other. Alternatively, if switches $602P_1$, $602P_4$, $602P_5$, $602S_2$ and $602S_3$ are connected (with switches $602S_1$, $602P_2$, $602P_3$ and $602P_5$ being disconnected), the cells connected at cell terminals $601_1$ and $601_2$ will be connected in parallel with each other, with the cell connected at cell terminals $601_3$ being connected in series.

Opening, e.g. disconnecting, one or more of the isolating switches 602I may isolate one or more cells from the others of the cells and/or the terminals 606. If one or more of the isolating switches is opened, it may be necessary to connect an additional switch e.g. an additional series or parallel switch 602S, 602P in order to maintain the connection between the each of the cells 102 that are not isolated and the terminals 606.

In some arrangements, the switches 404, 602 may comprise relays, such as electro-mechanical relays. Additionally or alternatively, the switches 404, 602 may comprise transistors, such as field effect transistors. Additionally or alternatively again, the switches may comprise any other type of switching element capable of selectively establishing a connection across the switch 404, 602.

The battery system may further comprise a controller (not shown) configured to control the operation of the switches 404, 602. Alternatively, the controller 14 depicted in FIG. 1 may be configured to control the operation of the switches 404, 602.

Figure 7:
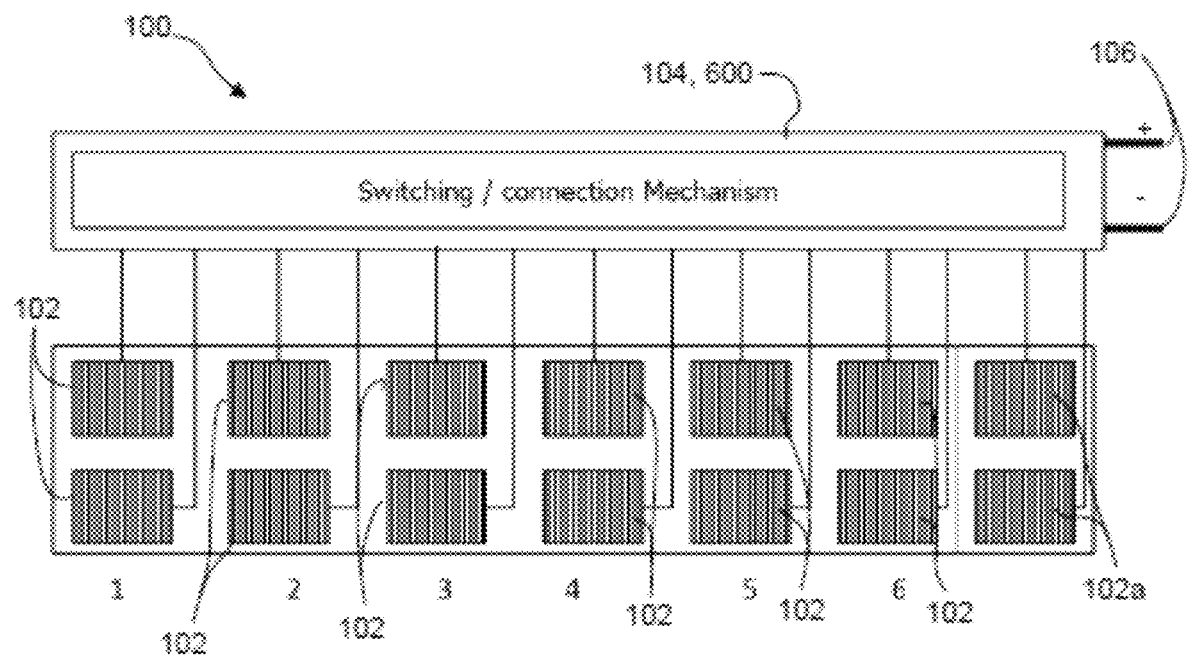
FIG. 7 is a schematic view of the battery system depicted in a third example configuration.

With reference to FIG. 7, in order to allow the voltage of the battery system 100 to be increased and/or to reduce the length of the period of operating before the vehicle 2 is able to perform a start-stop procedure, the battery system 100 may comprise one or more auxiliary cells 102a. If the controller 14 and/or the battery system 100 determines that the state of charge of one or more cells of the battery system are low and/or that the temperature of the battery system 100 is outside the operating temperature range, the controller 14 and/or the battery system 100 may adjust the configuration of the battery system 100 to connect one or more of the auxiliary cells 102a to the cells 102 and/or the terminals 106 in order to increase the voltage of the battery system 100. For example, the auxiliary cells 102a may be connected in series with the cells 102. Additionally or alternatively, the number or series connections between cells may be increased to increase the total voltage of the battery system 100.

When the temperature of the battery system 100 reaches the operating temperature range, the voltage of the battery system may increase. The voltage may increase above a desirable level for providing power to the electric motor 6. The controller 14 and/or the battery system 100 may determine that the temperature range is within the operating temperature range and/or may determine that the voltage of the battery system 100 is above the desirable level and may adjust the configuration of the battery system to disconnect the auxiliary cells from the other cells and/or the terminals 106.

FIGS. 2-7, and FIG. 9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 8:
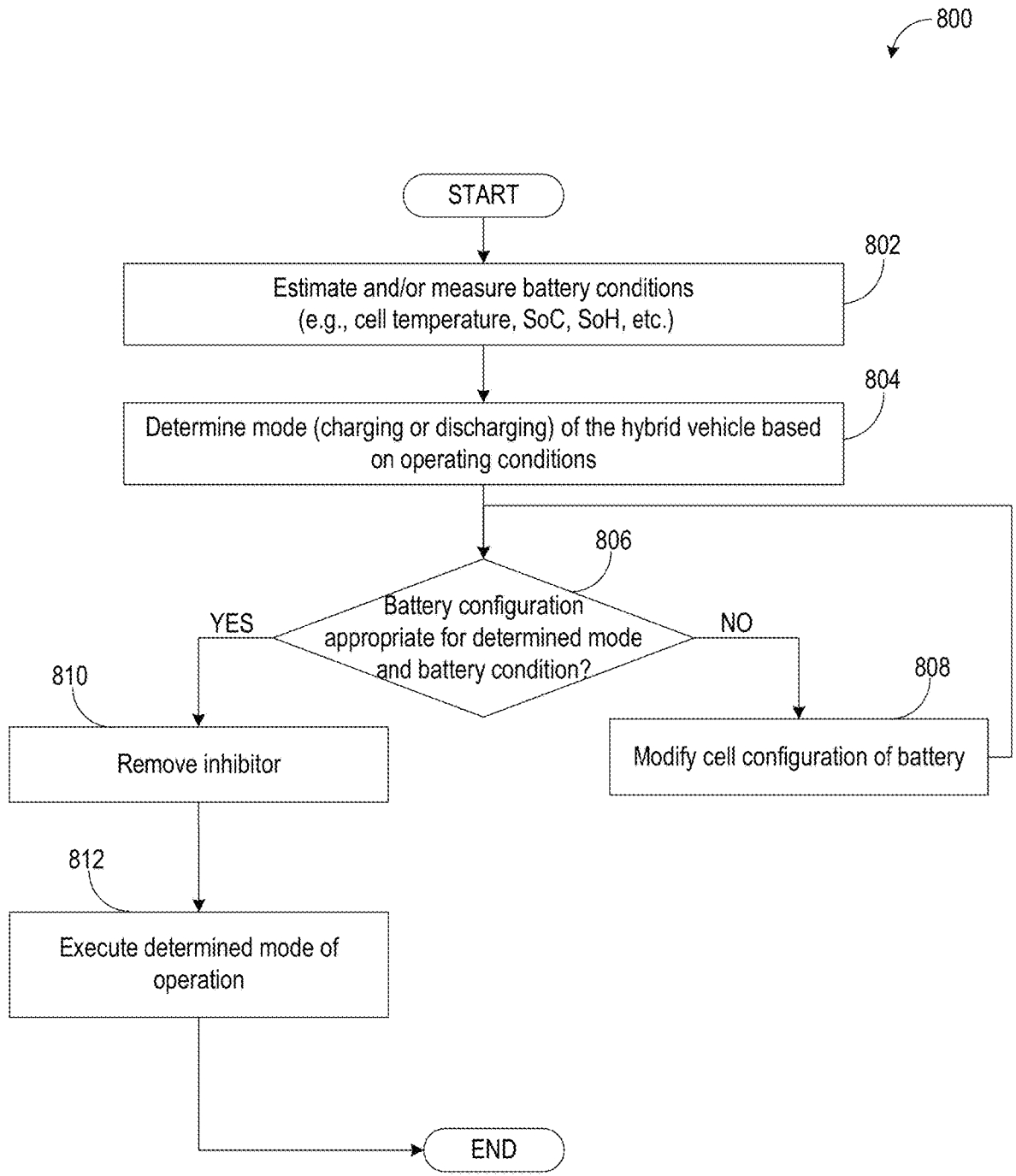
FIG. 8 is shows a method of operating a hybrid vehicle, according to arrangements of the present disclosure.

With reference to FIG. 8, a method 800 of operating a hybrid vehicle, according to an arrangement of the present disclosure, comprises a first step 802, in which engine operating conditions including battery conditions are estimated and/or measured. For example, the temperature of the battery system, e.g. a cell of the battery system is determined. In a second step 804 a current and/or anticipated operating mode of the hybrid vehicle is determined. The operating mode may be determined based on vehicle operating conditions such as operator torque demand and battery state of charge. In one example, the controller determines if the hybrid vehicle is on one of a first and a second operating mode. In the first operating mode, the battery system cells provide power to the drive system of the hybrid vehicle, and in the second operating mode, the battery system cells receive power from the drive system. As one example, when the operator torque demand is higher than a threshold, the vehicle may be operated in the first operating mode. When the operator torque demand is lower than the threshold, the vehicle may be operated in the second operating mode.

In a third step 806, the battery configuration is identified to determine whether the battery configuration is appropriate for the determined temperature and operating mode. For example, it may be determined if the current battery configuration is capable of providing the voltage required for the current operating mode. The controller may determine a voltage requirement of the battery system at least partially based on a current operating mode or an anticipated operating mode of the hybrid vehicle. If the battery configuration is ideal, such as when the required voltage can be provided by the current battery configuration, the method proceeds to a fifth step 810, in which a start-stop operation of the hybrid vehicle is permitted, e.g. an inhibitor preventing the hybrid vehicle may be removed. By removing a start-stop inhibitor, the hybrid vehicle is enabled to perform a start-stop procedure. The selected vehicle operating mode may then be executed at step 812. Alternatively, if the battery configuration is not ideal, the method proceeds to a fourth step 808 in which the configuration of the battery system is adjusted. Specifically, the configuration of the cells is adjusted in order to increase or decrease the voltage of the battery system according to the voltage requirement of the operating mode. After the configuration of the battery system has been adjusted, the method may return to the third step 806.

In one example, if the current operating mode or the anticipated operating mode of the hybrid vehicle is the first operating mode, the configuration of the cells may be adjusted, such as via actuation of switches and switching mechanisms, in order to increase the number of series connections (relative to parallel connections) between the cells, for example, to increase the voltage output by the battery. Alternatively, if the current operating mode or the anticipated operating mode of the hybrid vehicle is the second operating mode, the configuration of the cells may be adjusted, such as via actuation of switches and switching mechanisms, in order to increase the number of parallel connections (relative to series connections) between the cells, for example, to decrease the voltage output by the battery. In another example, in the first operating mode, the number of active cells electrically coupled to the electric motor may be increased while in the second operating mode, the number of active cells electrically coupled to the electric motor may be decreased. In one example, the number of active cells may be increased by reducing the number of active cells that are isolated. Likewise, the number of active cells may be decreased by increasing the number of active cells that are isolated.

The controller may further adjust the configuration of the cells at least partially according to the state of charge of the battery. For example, if the state of charge of the battery is below a threshold SOC level, the configuration of the battery system may be adjusted to increase the number of active (e.g. electrically connected) cells within the battery system and/or increase the number of series connections between cells. If the state of charge rises above the threshold SOC level, the configuration of the battery system may be adjusted to reduce the number of active cells within the battery system and/or increase the number of parallel connections between cells.

The controller may further adjust the configuration of the cells at least partially according to the battery temperature. If the temperature is below a first threshold value, the configuration of the battery system may be adjusted to increase the number of active (e.g. electrically connected) cells within the battery system. If the temperature rises above the first threshold value, the configuration of the battery system may be adjusted to reduce the number of active cells within the battery system.

If the temperature is above a second threshold value, the configuration of the cells may be adjusted by the controller to decrease the number of active cells within the battery system. If the temperature falls below the second threshold value, the configuration of the battery system may be adjusted to increase the number of active cells within the battery system. The first threshold value may relate to a lower temperature threshold and the second threshold value may relate to an upper temperature threshold. In other words, the second threshold value may be greater than the first threshold value. By reducing the number of active cells, the voltage of the battery system may be reduced so that the voltage does not exceed a maximum voltage for the hybrid system. As a result, deactivating cells may allow a high temperature limit of the battery system to be increased.

In some examples, in addition to the battery temperature, the configuration of the cells may be similarly adjusted responsive to ambient temperature. For example, as ambient temperature increases, the configuration of the battery system may be adjusted to reduce the number of active cells within the battery system.

The method may further comprise determining a voltage of one or more or each of the cells. The controller may isolate one or more of the cells from the others of the cells at least partially based on the voltage of the cells. The cells may be isolated at least partially based on the current operating mode or the anticipated operating mode of the hybrid vehicle.

For example, if the current or anticipated operating mode is the first operating mode, one or more cells having a lower voltage than others of the cells may be isolated, e.g. in order to increase the voltage of the battery system. In another example, cells having a lower voltage than an average voltage of the battery system (which is the average voltage across all the cells) may be isolated.

If the current or anticipated operating mode is the second operating mode, one or more cells having a voltage that is higher than others of the cells may be isolated, e.g. in order to decrease the voltage of the battery system. This may allow the cells having a lower state of charged to be charged whilst the battery system is operating within the second operating mode. In another example, cells having a higher voltage than an average voltage of the battery system (which is the average voltage across all the cells) may be isolated.

Adjusting the configuration of the cells may further comprise isolating one or more of the cells at random from the others of the cells. This may lead to a substantially equal duty cycle being applied to each of the cells.

The method may further comprise determining that one or more of the cells may be faulty and then isolating the faulty cells. A cell may be determined to be faulty if the voltage of the cell differs from the voltages of each of the other cells by a predetermined amount. Alternatively, a cell may be determined to be faulty if the voltage of the cell differs from an expected voltage of the cell by the predetermined amount. The method 800 may be repeated during operation of the hybrid vehicle, e.g. to ensure that the configuration of the battery system is regularly adjusted according to the temperature of the battery system and the current and/or anticipate operating mode of the hybrid vehicle. The method 800 may be repeated continuously. Alternatively, once the fifth step 810 of the method has been performed, there may be a delay before the method 800 is repeated.

Although in the arrangements shown in FIGS. 2, 3, and 6, particular ones of the cells are indicated as being the auxiliary cells 102*a*, the battery system 100 may be configured such that different ones of the cells 102 may act as the auxiliary cells 102*a* during different periods of operation of the battery system 100. The switching system 104 and/or the controller 14 may be configured to selectively determine which of the cells 102 are to be treated as the auxiliary cells 102*a*.

The auxiliary cells 102*a* may be selected randomly. Additionally or alternatively, the auxiliary cells 102*a* may be selected based on the voltage of the cells 102. In this way the cells 102 may be cycled, e.g. charged and discharged, evenly and/or an equal number of times during operation of the vehicle 2.

Following a plurality of charge and discharge cycles of the cells 102, the cells may reach an end of life condition in which the voltage of the cells 102 is reduced. When the cells 102 reach their end of life condition it may be desirable for the auxiliary cells 102*a* to be connected to the others of the cells 102 and/or the terminals 106 during normal operation of the vehicle 2, e.g. in the first operating mode. The arrangement shown in FIG. 6 therefore also depicts the configuration of the cells on the battery system 100 at the end of life condition of the battery system 100.

In the arrangements shown in FIGS. 2-3 and FIG. 7, each of the cells is connected to the switching system 104 and the switching system is configured to selectively vary the connections between each of the cells. However, with reference to FIG. 9, in other arrangements of the disclosure, two or more of cells 102 of a battery system 900 may be arranged in a fixed group 902, in which the cells are connected to each other in a desired configuration. For example, in the arrangement shown in FIG. 9, the fixed group of cells 902 comprises four cells, each of the cells is connected in parallel with another one of the cells and each pair of parallel connected cells is connected in series with the other pair of parallel connected cells.

The connections between the cells within the fixed group 902 may be fixed and may not be adjustable by the switching system 104, 600. The fixed group 902 may be coupled to the switching system 104, 600 in the same way as the cells 102, as described above with reference to FIG. 2.

The switching system 104, 600 may be configured to selectively vary the connections between the fixed group of cells 902 and the others of the cells 102. In this way, the switching system 104, 600 may be capable of adjusting the configuration of the battery system 900 into more than one configuration, however, the number of configurations may be reduced compared to in the arrangements shown in FIGS. 2-3 and FIGS. 4A-4B.

Figure 9:
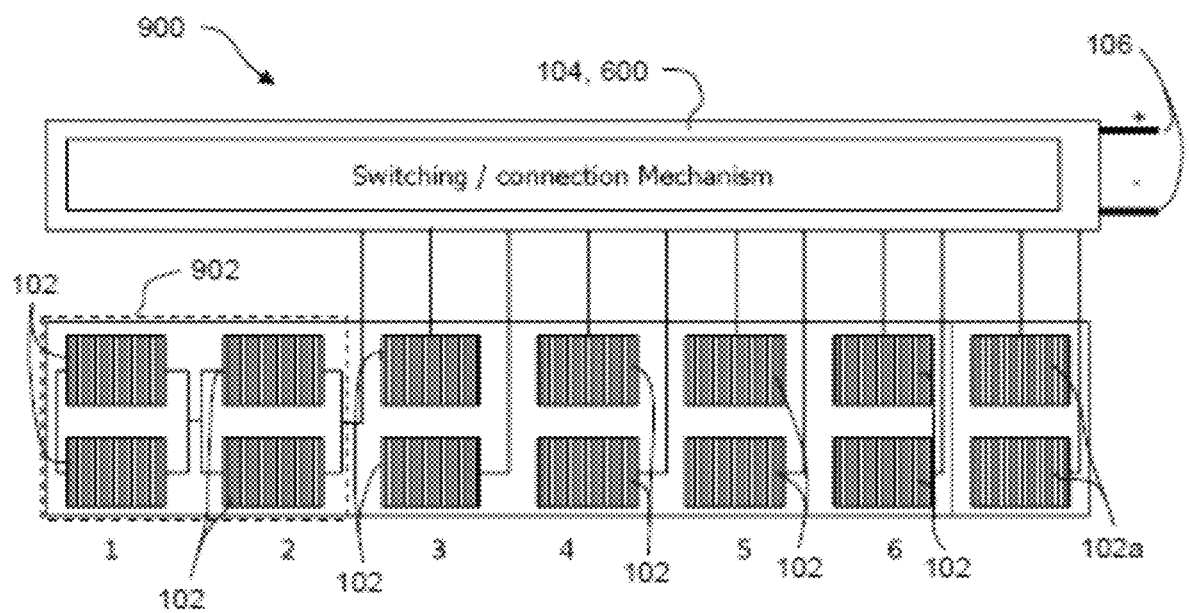
FIG. 9 is a schematic view of a further battery system, according to another arrangement of the disclosure, the further battery system being depicted in a fourth example configuration.

The arrangements shown in FIG. 9 may therefore reduce the complexity of the switching system 104, 600, whilst continuing to allow the battery system 900 to be configured in a plurality of different possible configurations, e.g. to supply a plurality of different voltages.

In any arrangements of the battery system 100, 900 described above, any of the cells 102 described above may comprise two or more sub-cells that have been connected in series or parallel to each other. The cell terminals 601 depicted in FIG. 6 may be coupled to individual cells or to groups of two or more sub-cells that have been connected in series or parallel to each other, or that are provided within a switching block SB configured to allow the configuration of the cells to be selectively varied, e.g. as depicted in FIGS. 2-3.

As mentioned above, the configuration of the battery system 100, 900 may be based at least partially on an anticipated operating mode of the vehicle. In other words, the vehicle may anticipate that it is expected to operate in the first or second operating mode and may adjust the configuration of the battery system pre-emptively according to the expected operating mode. For example, the vehicle may determine that it is approaching a motorway and may be about to accelerate on a slip road to reach a suitable speed for traveling on the motorway. The vehicle may adjust the configuration of the battery system accordingly, e.g. by increasing the number of series connections between the cells, in order to increase the voltage of the battery system. Similarly, the vehicle may anticipate a period of operation on the motorway during which the battery may be charged. Hence, the vehicle may adjust the configuration of the battery system to increase the number of parallel connections between the cells.

The vehicle may anticipate the operating mode of the vehicle based on route information that has been input to a navigation system of the vehicle, such as a satellite navigation system. Alternatively, route information may be predicted by the vehicle, e.g. based on previous journeys that have been made in the vehicle.

Additionally or alternatively, the vehicle may refer to information received from a vehicle to vehicle (V2V) or vehicle to infrastructure (V2I) communication system in order to anticipate the expected operating mode. For example, the vehicle may receive information from a V2V system indicating that vehicles ahead are slowing down and may adjust the configuration of the battery system in preparation for performing a period of regenerative breaking. In an alternative example, the vehicle may receive information from a V2I system indicating that a traffic signal ahead is about to turn green, the vehicle may therefore anticipate a period of acceleration and may adjust the configuration of the battery system accordingly.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

In one example, a method for a hybrid vehicle comprises adjusting a number and configuration of cells of a battery coupled to an electric motor of the vehicle responsive to each of a hybrid vehicle mode of operation and a battery temperature. In the preceding example, additionally or optionally, the adjusting includes actuating a switching mechanism to vary a ratio of series connections relative to parallel connection between individual cells of the battery to vary the number of active cells that are electrically coupled to the electric motor. In any or all of the preceding examples, additionally or optionally, the adjusting includes increasing the number of active cells when the hybrid vehicle operates in a battery discharging mode or the battery temperature is higher, and decreasing the number of active cells when the hybrid vehicle operates in a battery charging mode or the battery temperature is lower. In any or all of the preceding examples, additionally or optionally, the method further comprises adjusting start-stop operation of an internal combustion engine coupled to the hybrid vehicle based on the adjusted number and configuration of the cells of the battery, the start-stop operation enabled when the number of active cells is increased, the start-stop operation disabled when the number of active cells is decreased.

In a further representation, a method for a hybrid vehicle comprises: adjusting a number of cells of a battery coupled to an electric motor of the vehicle responsive to each of a hybrid vehicle mode of operation and a battery temperature. In the preceding example, additionally or optionally, the adjusting is further based on a state of charge of each of the number of cells.

In yet another representation, a method for a hybrid vehicle comprises: actuating a switching mechanism to vary a number of active cells of a battery that are electrically coupled, in series, to an electric motor of the vehicle responsive to each of a hybrid vehicle mode of operation, a battery temperature, and a state of charge of each of the active cells.

In any or all of the preceding examples, additionally or optionally, the method further comprises determining a voltage of one or more of the cells; and isolating one or more of the cells from the others of the cells at least partially based on the voltage of the cells. In any or all of the preceding examples, additionally or optionally, the one or more of the cells are isolated at least partially based on the current operating mode or the anticipated operating mode of the hybrid vehicle. In any or all of the preceding examples, additionally or optionally, if the selected operating mode is the first operating mode, the one or more cells having a lower voltage than others of the cells are isolated. In any or all of the preceding examples, additionally or optionally, if the selected operating mode is the second operating mode, one or more cells having a voltage that is higher than others of the cells are isolated. In any or all of the preceding examples, additionally or optionally, adjusting the configuration of the cells comprises isolating one or more of the cells at random from the others of the cells. In any or all of the preceding examples, additionally or optionally, the method further comprises determining that one or more of the cells may be faulty; and isolating the faulty cells. In any or all of the preceding examples, additionally or optionally, the method further comprises removing a start-stop inhibitor to enable the hybrid vehicle to perform a start-stop procedure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid vehicle system, comprising:
    a hybrid vehicle including an internal combustion engine and an electric motor mechanically coupled to a drive system of the hybrid vehicle;
    a battery system comprising a plurality of cells, wherein the plurality of cells of the battery system is electrically coupled to the electric motor of the hybrid vehicle, the battery system further comprising one or more additional cells selectively electrically couplable to the electric motor; and
    a controller configured with computer readable instructions stored on non-transitory memory for:
        operating the hybrid vehicle in a first operating mode, in which the plurality of cells in the battery system provides power to the drive system;
        operating the hybrid vehicle in a second operating mode, in which the plurality of cells in the battery system receives power from the drive system;
        determining a state of charge of one or more of the plurality of cells of the battery system and a temperature of the battery system; and
        responsive to the state of charge of the one or more of the plurality of cells of the battery system being below a threshold value or the temperature of the battery system being below a threshold value,
            electrically connecting the plurality of cells in the battery system cells and the one or more additional cells in the battery system together so as to increase a voltage of the battery system;
            permitting a stop-start operation of the internal combustion engine of the hybrid vehicle;
            determining a voltage requirement of the battery system at least partially based on a current operating mode or an anticipated operating mode of the hybrid vehicle; and
            adjusting a configuration of the plurality of cells in order to increase or decrease the voltage of the battery system according to the voltage requirement;
        wherein the plurality of cells and the one or more additional cells are provided within a first group of cells and a second group of cells, wherein a configuration of the first group of cells is adjustable and a configuration of the second group of cells is not adjustable.

2. The hybrid vehicle system of claim 1, wherein the controller is further configured to adjust the configuration of the plurality of cells at least partially based on the temperature of the battery system.

3. The hybrid vehicle system of claim 1, wherein the controller is further configured to adjust the configuration of the plurality of cells at least partially based on the state of charge of the one or more of the plurality of cells of the battery system.

4. The hybrid vehicle battery system of claim 1, wherein adjusting the configuration of the plurality of cells comprises adjusting a number of active cells within the battery system by increasing or decreasing a number of series connections between the plurality of cells relative to a number of parallel connections between the plurality of cells.

5. The hybrid vehicle system of claim 1, wherein the battery system further comprises a plurality of switches configured to allow one or more of the plurality of cells to be selectively connected to the others of the plurality of cells and the one or more additional cells in a plurality of configurations, the plurality of switches configured to allow one or more of the plurality of cells to be selectively isolated from the others of the plurality of cells and the one or more additional cells, wherein adjusting the configuration of the plurality of cells comprises isolating one or more of the plurality of cells from the others of the plurality of cells via the plurality of switches.

6. The hybrid vehicle system of claim 1, wherein the controller is further configured to:
    determine a voltage of one or more of the plurality of cells;
    determine a current or anticipated operating mode of the hybrid vehicle based on vehicle operating conditions including torque demand and battery state of charge; and
    isolate one or more of the plurality of cells from the others of the plurality of cells at least partially based on the voltage of the plurality of cells and further based on the current operating mode or the anticipated operating mode of the hybrid vehicle.

7. A method for a hybrid vehicle, comprising:
    adjusting a configuration of a plurality of cells of a battery system coupled to an electric motor of the hybrid vehicle responsive to a change in one or more of a hybrid vehicle mode of operation and a battery temperature, wherein the electric motor is mechanically coupled to a drive system of the hybrid vehicle;
    wherein adjusting the configuration of the plurality of cells includes:
        responsive to determining that a state of charge of one or more of the plurality of cells of the battery system is below a threshold value and/or that a temperature of the battery system is below a threshold value, electrically connecting one or more of the plurality of cells of the battery system and one or more additional cells of the battery system together to increase a voltage output from the battery system and transferred to the electric motor;
        responsive to connecting the one or more of the plurality of cells to the one or more additional cells, permitting a stop-start operation of an internal combustion engine of the hybrid vehicle; and subsequent to the stop-start operation, electrically disconnecting the one or more of the plurality of cells from the one or more additional cells.

8. The method of claim 7, wherein the adjusting the configuration of the plurality of cells includes actuating a switching mechanism to vary a ratio of series connections relative to parallel connections between individual cells of the battery system to vary a number of active cells that are electrically coupled to the electric motor.

9. The method of claim 8, wherein the adjusting includes increasing the number of active cells when the hybrid vehicle operates in a battery discharging mode or the battery temperature is higher, and decreasing the number of active cells when the hybrid vehicle operates in a battery charging mode or the battery temperature is lower.

10. The method of claim 8, wherein the ratio of the series connections relative to the parallel connections is decreased when a state of charge of the battery system surpasses a threshold value.

11. A method of operating a hybrid vehicle comprising:
an internal combustion engine and a battery system having a plurality of cells, wherein the hybrid vehicle has a first operating mode in which the plurality of cells in the battery system provides power to the drive system, and a second operating mode in which the plurality of cells in the battery system receives power from the drive system;
responsive to determining that a state of charge of one or more of the plurality of cells of the battery system is below a threshold value or that a temperature of the battery system is below a threshold value,
electrically connecting the one or more of the plurality of cells of the battery system and one or more additional cells of the battery system together so as to increase a voltage output by the battery system to an electric motor mechanically coupled to a drive system of the hybrid vehicle;
permitting a stop-start operation of an internal combustion engine of the hybrid vehicle;
operating the hybrid vehicle in one of the first operating mode, and the second operating, wherein the operating mode is selected based on a plurality of operating conditions including torque demand and a state of charge of the battery system;
determining a voltage requirement of the battery system at least partially based on the selected operating mode of the hybrid vehicle; and
adjusting a configuration of the plurality of cells in order to increase or decrease the voltage output by the battery system according to the voltage requirement of the selected operating mode, wherein if the selected operating mode of the hybrid vehicle is the first operating mode, the configuration of the plurality of cells is adjusted in order to increase a number of series connections between the plurality of cells and/or the one or more additional cells, and wherein if the selected operating mode of the hybrid vehicle is the second operating mode, the configuration of the plurality of cells is adjusted in order to increase a number of parallel connections between the plurality of cells and/or the one or more additional cells.

12. The method of claim 11, wherein the method further comprises:
further adjusting the configuration of the plurality of cells according to each of the state of charge of the one or more of the plurality of cells of the battery system and the temperature of the battery system, the configuration of the plurality of cells adjusted to increase a number of active cells within the battery system if the temperature is below a lower threshold value, and the configuration of the plurality of cells adjusted to decrease the number of active cells within the battery system if the temperature is above an upper threshold value.

13. The method of claim 12, wherein the method further comprises:
adjusting the configuration of the plurality of cells at least partially according to the temperature of the battery system.

14. The method of claim 13, wherein adjusting the configuration of the plurality of cells at least partially according to the temperature of the battery system includes, if the temperature is below the lower threshold value, adjusting the configuration of the plurality of cells to increase the number of active cells within the battery system.

15. The method of claim 14, wherein adjusting the configuration of the plurality of cells at least partially according to the temperature of the battery system includes, if the temperature is above the upper threshold value, adjusting the configuration of the plurality of cells to decrease the number of active cells within the battery system.

16. The method of claim 12, wherein if a current operating mode or an anticipated operating mode of the hybrid vehicle is the first operating mode, the configuration of the plurality of cells is adjusted in order to increase the number of series connections between the plurality of cells.

17. The method of claim 11, wherein permitting the stop-start operation of the internal combustion engine of the hybrid vehicle includes disabling a start-stop inhibitor, the method further comprising:
determining that at least one or more of the plurality of cells are faulty; and
isolating the one or more of the plurality of cells determined to be faulty from a remainder of the plurality of cells.

* * * * *